May 30, 1950        A. J. HIRST        2,509,769

RESILIENT MOUNTING

Filed July 15, 1948        4 Sheets-Sheet 1

INVENTOR.
Archie John Hirst.
BY
Harness, Dickey & Pierce.
ATTORNEYS.

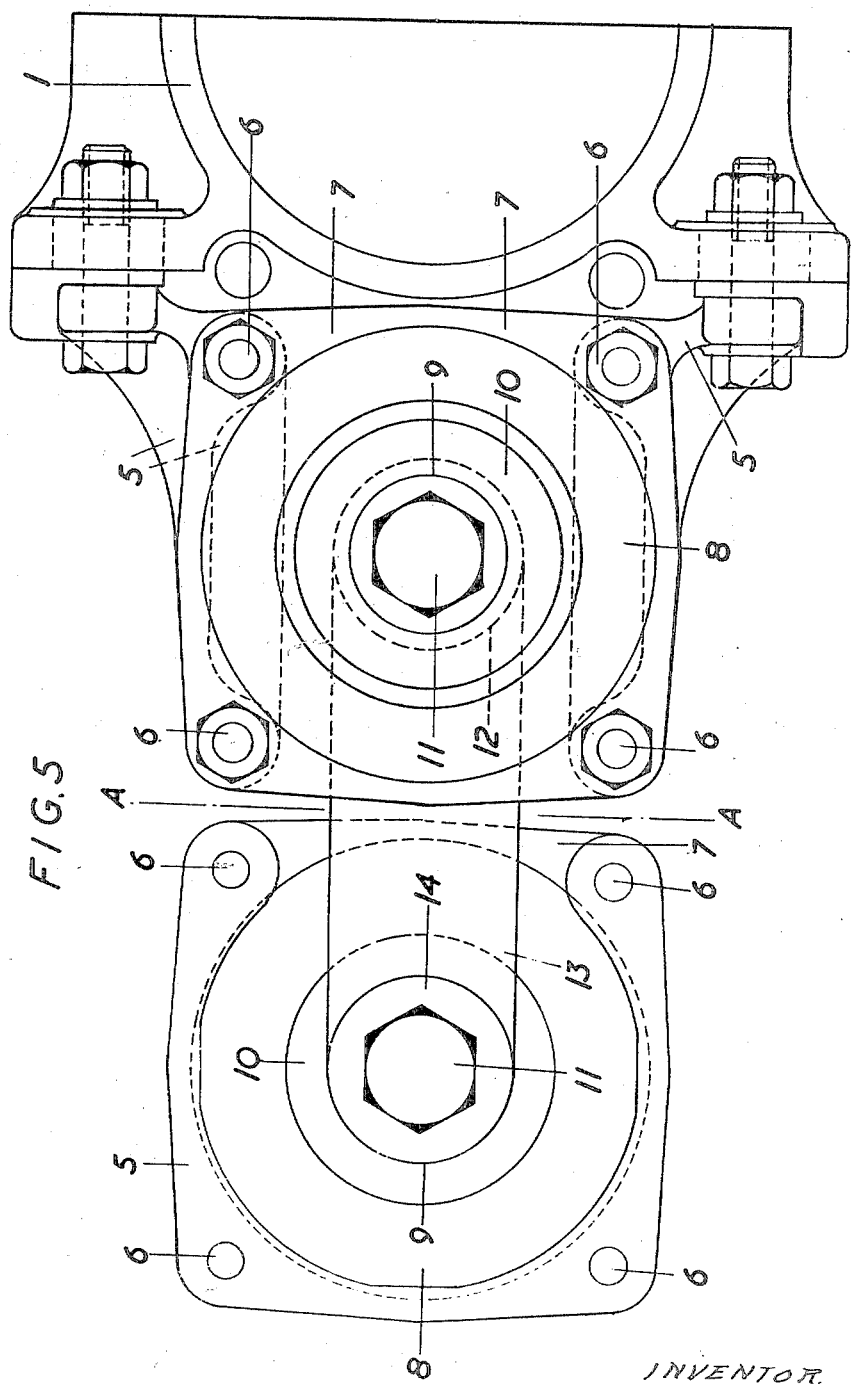

May 30, 1950 — A. J. HIRST — 2,509,769
RESILIENT MOUNTING
Filed July 15, 1948 — 4 Sheets-Sheet 3

INVENTOR.
Archie John Hirst.
BY
Harness, Dickey & Pierce.
ATTORNEYS.

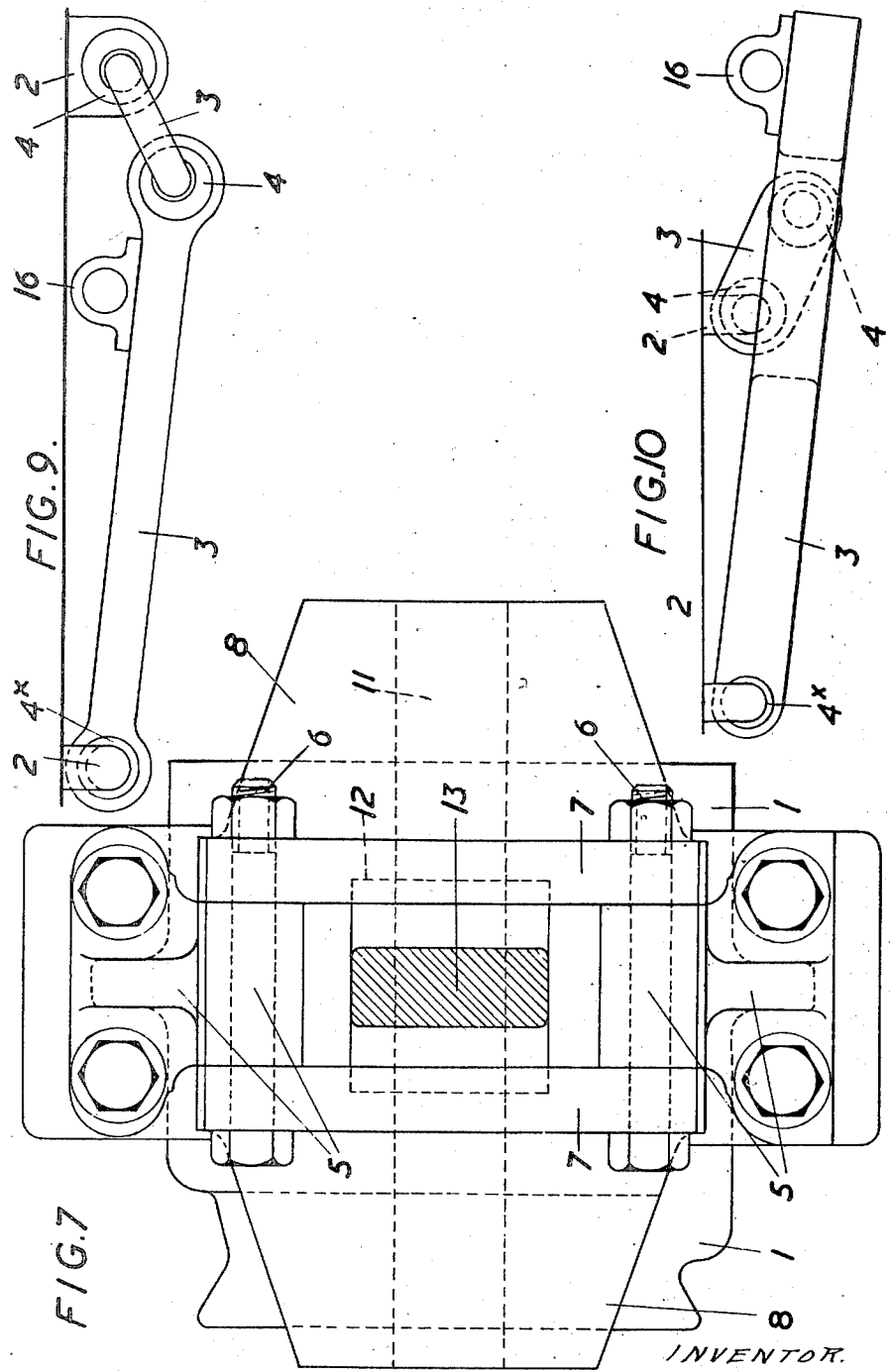

Patented May 30, 1950

2,509,769

UNITED STATES PATENT OFFICE 2,509,769

RESILIENT MOUNTING

Archie John Hirst, Leicester, England, assignor to Metalastik Limited, Leicester, England, a British company Application July 15, 1948, Serial No. 38,926
In Great Britain January 3, 1947

10 Claims. (Cl. 248—358)

This invention relates to resilient mountings of the kind in which pivoted links with resilient bushes about their pivots are employed for suspending or supporting bodies which, due to external or internal vibrational forces or other irregularities, have movements relative to their base or supporting or suspending means, which movements require to be controlled. The mountings are applicable to various purpose, for example as engine mountings, as a rail or road vehicle body suspension system, as axle mountings and so on.

According to the present invention, the mounting comprises a system of inextensible links, the angular relationship of which is varied by relative movement of the base or suspending or supporting member and the body mounted thereon by the links, and is characterised in that under normal loading conditions the links are substantially in line and their pivotal connections include rubber or like resilient bushes which are then concentric with the pivotal axes of the links so that the continuous load is carried by the bushes in torsion, whereas deflection of the system to either side of the normal loading position, as a result of abnormal load conditions causing displacement of the axes of the link pivots, is resisted with increasing stiffness due to the bushes becoming eccentric as compressive components on the bushes are brought into play.

The term "concentric with the pivotal axes of the links," while more applicable to cylindrical bushes, is intended to include conical bushes since the latter in the normally loaded position of the system will not be distorted and the walls of the bushes rendered unsymmetric so that such conical bushes also are, under normal condition, subjected mainly to torsional load.

Deflection of the system from the normal or aligned position is resisted in the initial stages mainly by the torsional resistance of the resilient bushes and, as the deflection increases, the compressive resistance of the bushes increases more rapidly than their torsional resistance so that large deflections will be resisted mainly by the compressive resistance of the bushes. The mounting may be so arranged that the links have a considerable load in shear to support the average load in the normal position, and the proportion of the load carried in shear and in compression and also the degree of non-linearity can be modified according to the properties of the resilient bushes employed in the pivotal connections. Preferably the resilient bushes employed would be of the kind described in the specification of our application for Letters Patent of the United States 765,714 in which, after surface bonding the rubber or like material to the inner and outer metal sleeves of the bush, one of said sleeves is distorted so as to reduce the radial space between the sleeves and place the intermediate annulus of resilient filling material in a state of uniform radial compression. The use of pre-compressed resilient bushes of this kind in resilient mountings according to the present invention avoids subjecting the resilient material to tension since as the linkage is deflected to displace the inner sleeve radially in the outer sleeve and thereby increase the compression in the resilient material at one side of the bush, the initial compression in the resilient material at the opposite side of the bush will merely be relieved and said inner sleeve will automatically take up its concentric position when the increased load is removed from the linkage.

The invention will now be described with reference to the embodiments shown, by way of examples, in the accompanying drawings; wherein:

Figure 1 shows the linkage system in the normal position and Figures 2 and 3 show the linkage system deflected to either side of the normal position.

Figure 5 is a half side elevation showing a practical application of the arrangement shown in Figure 4 and employing conical resilient bushes.

Figure 7 is a section taken on the line A—A of Figure 5.

Figures 9 and 10 are similar diagrammatic views showing applications of the invention to motor car rear axle suspensions.

Figure 1:
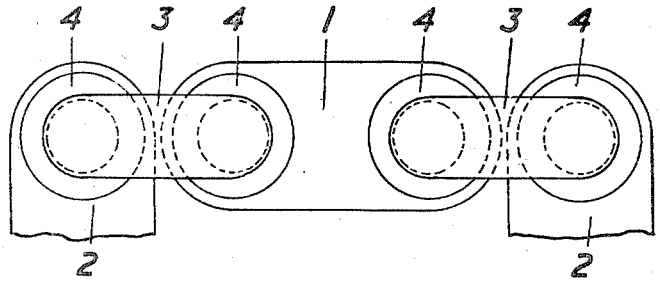
Figures 1, 2 and 3 are diagrammatic views of a resilient mounting which is applicable as a mounting for the engine of a motor vehicle.
Figure 2:
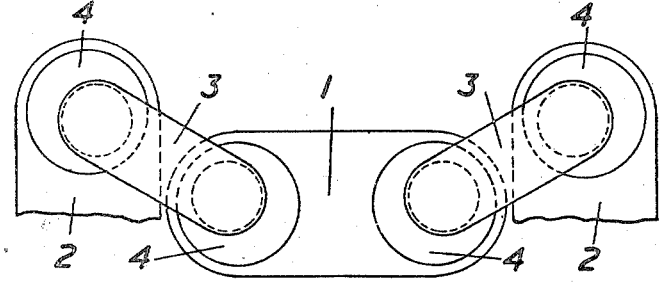
Figure 3:
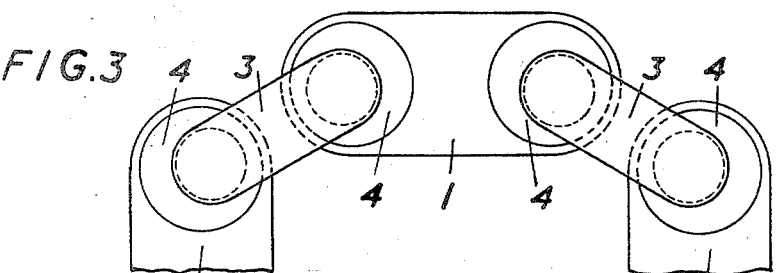

Referring to Figures 1 to 3 of the drawings, the engine, represented by the tie member 1, is connected to fixed anchorages 2 on the chassis members (not shown) at each side by a suspension link 3 having pivotal connections through resilient bushes 4 with the engine 1 and said chassis anchorages 2, said links 3 extending laterally and the bushes 4 preferably being of the precompressed kind above referred to. In the normal position, when the engine is not running and the vehicle is stationary, the opposed links 3 are in horizontal alignment as shown in Figure 1, said links having a considerable strain in shear to support the engine and said bushes being concentric with the pivotal axes of the links. Deflection of the linkage system from the normal position, either downwards as shown in Figure 2 or upwards as shown in Figure 3, subjects the resilient bushes 4 to torsion and to compression which increases with the deflection so as to give a rapidly rising stiffness rate, the torsion being introduced as a result of the angular movements of the opposed links 3 and the compression resulting from the displacements of the pivotal axes of the links causing the bushes 4 to become eccentric so as to accommodate the increase in the effective length of the linkage system between the anchorages 2. Thus movements of the engine relatively to the chassis in a vertical direction under running conditions would be effectively controlled and damped by the resilient mounting.

This engine mounting system may be used, for example, to replace the shear type rear mountings disclosed in the specification of my United States patent application No. 10,878, the principle of inclining the mounting so as to operate in a plane at right-angles to the principal axis of the engine being retained. In such an application of the invention, the torque reaction buffers 11 in the aforesaid specification may be dispensed with since applied torque would produce steeply rising characteristics, either upwards or downwards, and give improved vibration insulation. The stiffness rate may be low for engine idling conditions and increase sufficiently under running conditions to avoid excessive movement or engine bounce on rough roads.

A link suspension system similar to that described with reference to Figures 1 to 3 may be employed for the rear axle suspension of a motor car where large load variation is usually compensated for by the variable spring rate and a rapidly increasing stiffness rate for bump or rebound is considered desirable. In such an application of the invention the links used would be considerably longer than those employed in an engine mounting and a separate torque reaction member such as a torque tube may be necessary.

A further similar application of the invention is to the suspension or support of rail vehicle bogies on their axle boxes. Such an application is shown diagrammatically in Figure 4 in which the tie member 1 represents the axle box which is connected by opposed links 3 to fixed anchorages 2 on the bogie, the pivotal connections of the links 3 being afforded by resilient bushes 4 as previously described.

Figure 4:
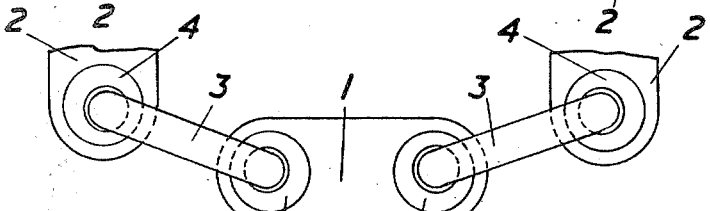
Figure 4 is a similar view to Figure 2, but showing an arrangement applicable as the suspension or support for rail vehicle bogies on their axle boxes.
Figure 6:
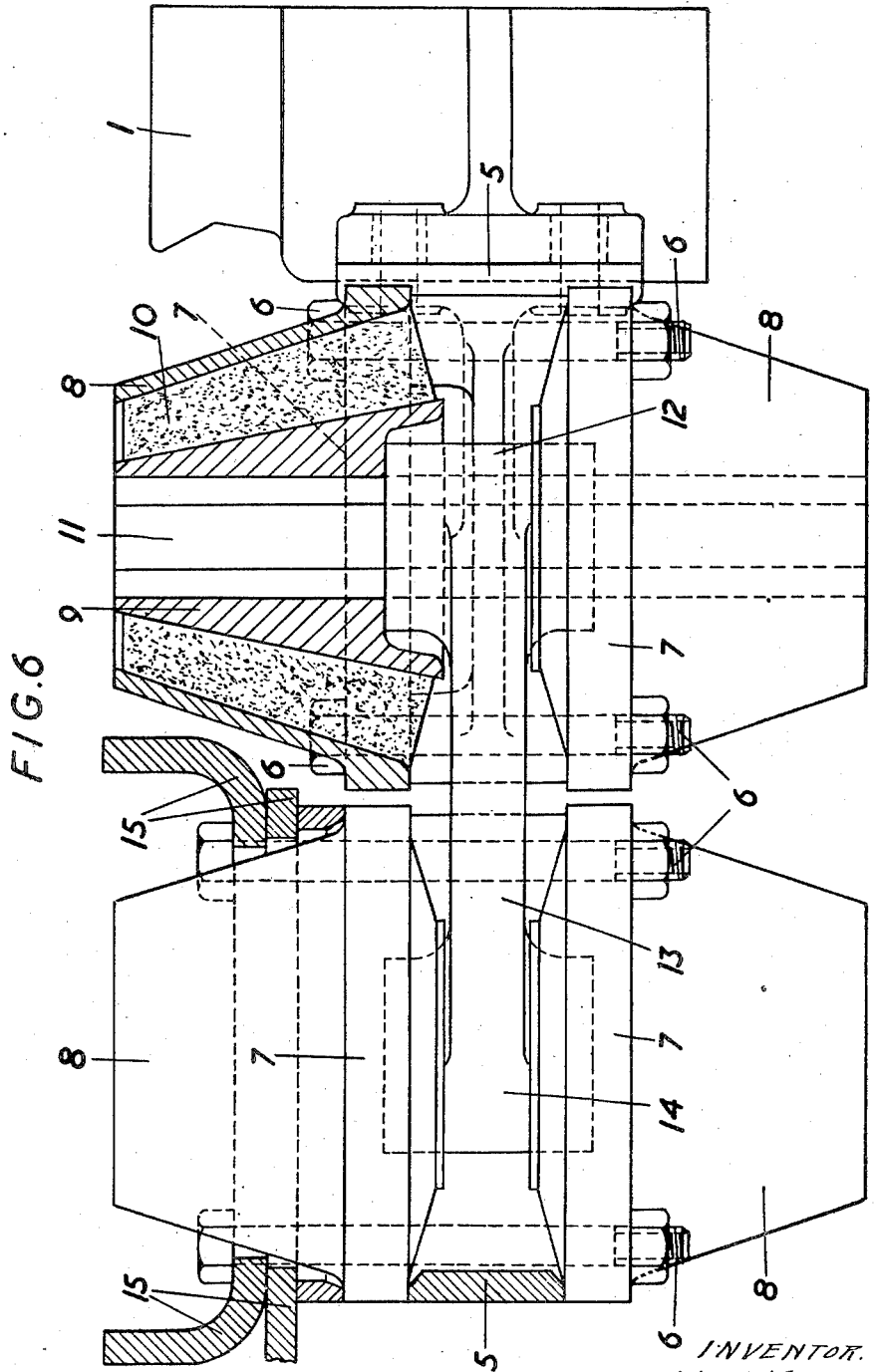
Figure 6 is a plan, partly in section, of Figure 5.

A constructional embodiment of the application illustrated diagrammatically in Figure 4 is shown in Figures 5, 6 and 7. In this construction a pair of laterally extending brackets 5 is bolted to each side of the journal bearing or axle box 1 in vertically spaced relation, and to the opposite sides of each pair of brackets 5 are secured by corner bolts 6 the rectangular attachment plates 7 of two axially aligned and opposed resilient bushes of the conical type. Each resilient bush comprises an outer conical metal sleeve 8 and a co-axial inner metal sleeve 9, affording an annular space between them, said space being filled with a conical rubber sleeve element 10 which is vulcanised to the confronting conical faces of said outer and inner metal sleeves 8, 9. The tapers of the two confronting conical faces to which the rubber sleeve is bonded are different and such that the wall thickness of said rubber sleeve element 10 at its wider or inner end is greater than at its narrower or outer end.

The inner conical metal sleeves 9 have axial through bores of hexagonal cross section which receive the opposite ends of a coupling pin 11 of corresponding cross section, and this pin 11 also passes through a corresponding hexagonal hole formed through a boss 12 at the inner end of a suspension link 13. The suspension link 13 is keyed at its outer end, through a boss 14, to the hexagonal coupling pin of a further conical bush assembly which is similar to that above described except that the "brackets" 5 are integrally formed and merely serve as distancing members for the attachment plates 7 of the two opposed resilient bushes and the corner bolts 6 serve not only to secure the parts together but also to fix said assembly to the vehicle frame 15.

Thus in the complete suspension system there are eight resilient conical bushes and two opposed suspension links for each journal or axle box mounting, there being at each side four such bushes connected together in pairs by a suspension link, and the outer metal sleeves of the bushes of each pair are rigidly fixed whilst the inner metal sleeves thereof and the interposed end of the link are rigidly coupled together as a unit which is capable of rotational and small translational movements relatively to the fixed metal sleeves, such movements being allowed by the flexibility of the conical rubber sleeves and controlled by the stiffness thereof.

In a modification of this construction, instead of employing single centrally located suspension links, each link may be of duplex form, the two parts of the link connecting the outer ends of the coupling pins of the two pairs of conical resilient bushes.

Figure 8:
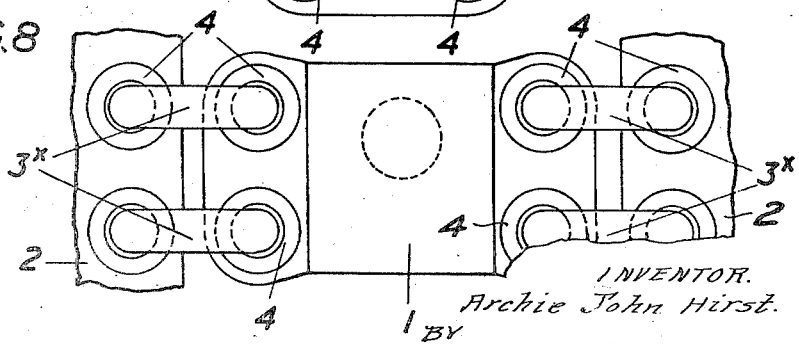
Figure 8 is a similar view to Figure 4 but showing a duplicated system of suspension links.

In the application of the invention to axle box suspensions it may be necessary or desirable, instead of using the arrangement shown diagrammatically in Figure 4, to employ an arrangement as shown in Figure 8 in which the journal or axle box 1 is connected by a parallelogram linkage 3x at either side to the fixed anchorages 2, the pivotal end connections of all the links being through resilient bushes 4, preferably of the precompressed kind, as previously described. With this arrangement, as with the arrangements shown in Figure 4 and Figures 5, 6 and 7, the opposed links would be in horizontal alignment under normal load conditions when the vehicle is stationary, although with such arrangements it may be desirable that the links have a slight upward inclination toward the axle box under the tare load, the addition of normal passenger or freight load giving an immediately rising characteristic as the links are brought down to the normal or horizontally aligned positions. The stiffness of the suspensions is preferably made approximately proportional to the loads supported so as to secure operation similar to that which obtains in the well known "Horstman constant periodicity" spring suspensions. The linkage system will provide ample resistance to longitudinal and torsional loads due to acceleration and braking both in motor and trailer bogies, and the transverse stiffness of the axle box mounting may be found to be sufficient to enable the usual horn cheeks to be dispensed with, especially if the system utilises conical type resilient bushes connected together in pairs as described with reference to Figures 5, 6 and 7.

In the application of the invention to a motor car rear axle suspension as shown in Figure 9, one of the opposed links 3 is considerably longer than the other, and this longer link 3 is connected through a very stiff resilient bush 4ˣ at its forward end to a fixed anchorage 2 on the chassis and at its rear end through a resilient bush 4 to the forward end of the other or shorter link 3 which extends rearwardly and has its rear end connected through another resilient bush 4 to a second anchorage 2 on the chassis. The axle bearing 16 is connected to the longer link 3 by means of a hinge or swivel mounting (not shown) so as to provide the requisite flexibility.

In a modification the longer link may be extended rearwardly beyond its pivotal connection with the shorter link and the axle bearing may be attached to this extension, thereby affording increased travel for the axle as compared with the deflection of the toggle-like linkage. An arrangement with this modification is shown in Figure 10 and in this figure the shorter link, instead of being directed rearwardly from its pivotal connection with the longer link is shown as directed forwardly therefrom to a rear anchorage 2: this arrangement has the advantage that it enables the suspension to be extended beyond the rear of the chassis.

Where the term "rubber" is used in this specification and claims it is intended to include suitable synthetic or artificial rubber as well as rubber produced from natural sources.

I claim:

1. A resilient mounting for supporting a body member on spaced supporting members, said mounting comprising a plurality of link members of rigid material pivotally connected at their opposite ends to said body member and said supporting members, the pivotal connection at each end of each of said link members including a pivot pin on one of said members, means on the other of said members defining a recess, and a bush of resilient material encircling said pivot pin and received in said recess, said link members under normal static loading conditions being disposed in substantially parallel relation and extending in substantially the same plane and each pivot pin being substantially concentric with the associated recess and under conditions causing deflections of the link members in either direction from the normal static loading position each pivot pin becoming eccentric of its associated recess and producing a compression at one side of the bush received on the pivot pin, which compression has a relatively slowly increasing component opposing deflection during small deflections of the link members and which component increases more rapidly as the deflection of the link members increases.

2. A resilient mounting as defined in claim 1, wherein said link members under normal static loading are disposed substantially in line.

3. A resilient mounting as defined in claim 1, wherein the inner peripheral surface of each bush is secured against movement relative to the pivot pin upon which the bush is received and the outer periphery surface of the bush is secured against movement relative to the wall of the recess in which it is received and in which said bushes are torsionally preloaded so that the normal static load on the resilient mounting is carried by said bushes principally in torsional shear.

4. A resilient mounting as defined in claim 1, wherein the inner peripheral surface of each bush is secured against movement relative to the pivot pin upon which the bush is received and the outer periphery surface of the bush is secured against movement relative to the wall of the recess in which it is received and in which said bushes are torsionally preloaded so that the normal static load on the resilient mounting is carried by said bushes principally in torsional shear, and in which deflection of said links in its initial stages is resisted primarily by said bushes in torsional shear and as deflection increases is resisted primarily by said component of said compression.

5. A resilient mounting as defined in claim 1, wherein under normal static loading said link members are disposed substantially in line and each of said bushes comprises concentric inner and outer metal sleeves defining an annular space therebetween and a rubber sleeve filling said space and having its inner and outer surfaces bonded to said sleeves, and wherein said bushes are torsionally preloaded so that the normal static load on said resilient mounting is carried by said bushes principally in torsional shear.

6. A resilient mounting as defined in claim 1, wherein each of said bushes comprises concentric inner and outer metal sleeves defining an annular space therebetween and a rubber sleeve filling said space and having its inner and outer surfaces bonded to said sleeves, and the bushes are torsionally preloaded so that the normal static load on said resilient mounting is carried by said resilient bushes principally in torsional shear, and wherein the adjacent surfaces of said sleeves and said rubber sleeve are conical.

7. A resilient mounting as defined in claim 1, wherein under normal static loading said link members are disposed substantially in line and each of said bushes comprises concentric inner and outer metal sleeves defining an annular space therebetween and a rubber sleeve filling said space and having its inner and outer surfaces bonded to said sleeves, and wherein said bushes are torsionally preloaded so that the normal static load on said resilient mounting is carried by said bushes principally in torsional shear, and the inner of said sleeves is secured to the pivot pin on which the bush is received and the outer of said sleeves is secured to one of said members.

8. A resilient mounting as defined in claim 1, wherein each of said bushes comprises concentric inner and outer metal sleeves defining an annular space therebetween and a rubber sleeve filling said space and having its inner and outer surfaces bonded to said sleeves, and the bushes are torsionally preloaded so that the normal static load on said resilient mounting is carried by said reslient bushes principally in torsional shear, and wherein the adjacent surfaces of said sleeves and said rubber sleeve are conical, and said bushes are disposed in pairs on each pivot pin with the bushes of each pair oppositely disposed and having their inner sleeves coupled together for rotation as a unit.

9. A resilient mounting as defined in claim 1, wherein said plurality of link members includes a plurality of pairs of link members and the links of each of said pairs are disposed substantially in line under normal static loading.

10. A resilient mounting for supporting a body member on a pair of spaced supporting members, said mounting comprising a plurality of links of rigid material connecting said body member to said spaced supporting members, pivot pins connected to said links, and bushes of resilient material received on said pivot pins and mounted on said members and providing pivotal connections of said links to said members, said links under normal static loading conditions extending substantially in line and each pivot pin being substantially concentric with the bush on said pin and under conditions causing deflection of the links in either direction from the normal static loading position the pivot pin at each bush becoming eccentric of said bush and producing a compression at one side thereof which has a relatively slowly increasing component opposing deflection during small deflections of said links and which component increases more rapidly as the deflection of the links increases.

ARCHIE JOHN HIRST.

REFERENCES CITED

The following references are of record in the file of this patent:

UNITED STATES PATENTS

| Number | Name | Date |
| --- | --- | --- |
| 1,975,145 | Geyer | Oct. 2, 1934 |
| 2,440,670 | Kaemmerling | Apr. 27, 1948 |
| 2,460,292 | Ivanovic | Feb. 1, 1949 |
| 2,467,721 | Avila | Apr. 19, 1949 |

FOREIGN PATENTS

| Number | Country | Date |
| --- | --- | --- |
| 133,084 | Switzerland | June 24, 1927 |
| 433,512 | Great Britain | Aug. 5, 1935 |
| 547,961 | Great Britain | Sept. 18, 1942 |